(12) United States Patent
Slusky

(10) Patent No.: US 6,373,229 B1
(45) Date of Patent: Apr. 16, 2002

(54) BATTERY CHARGING SYSTEM FOR PORTABLE ELECTRONIC DEVICES

(75) Inventor: Ronald D. Slusky, Highland Park, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/815,784

(22) Filed: Mar. 23, 2001

(51) Int. Cl.[7] .......................... H02J 7/00; G08B 21/00; H04L 1/00
(52) U.S. Cl. .................. 320/165; 340/636; 455/573
(58) Field of Search ............................. 320/165, 157, 320/162; 340/636; 455/572, 573

(56) References Cited

U.S. PATENT DOCUMENTS 5,867,797 A * 2/1999 Hashimoto .................. 455/572
6,014,011 A * 1/2000 Defelice et al. ............ 320/114

* cited by examiner

Primary Examiner—Gregory Toatley
(74) Attorney, Agent, or Firm—David W. Herring

(57) ABSTRACT

A stand-alone battery charger warning system for use with portable electronic devices is disclosed whereby a warning is generated in response to a determination that a) a battery is not presently connected to the charger and b) at least one predetermined time criterion has been met. This warning system advantageously may be used universally with any number of different battery chargers and is not limited to just one make or model. A particular embodiment of the present invention consists of a housing within which is contained the electronic circuitry and controls necessary to implement the warning system functionality. This housing is connected to an electrical source, such as a typical home electrical outlet. The battery charger for the portable electronic device is then connected electrically to the warning system. The current time of day may be automatically set in the electronic circuitry of the warning system by utilizing an antenna to receive a time of day indication signal from an external time source, such as one of the Coordinated Universal Time Clocks. If a predetermined time criterion is reached (e.g., illustratively, a pre-set time of day) and it is determined that the battery is not presently in the battery charger, then the warning system generates a warning. In a particular embodiment, the invention utilizes the detection of current flow to the battery charger to determine whether or not the battery is in the battery charger. The warning system interprets a lack of current flow as indicating that the battery is not present in the battery charger and, upon reaching the predetermined time criterion, generates an alarm.

7 Claims, 3 Drawing Sheets

BATTERY CHARGING SYSTEM FOR PORTABLE ELECTRONIC DEVICES

FIELD OF THE INVENTION

The present invention is related generally to battery charging and, in particular, to the charging of batteries used in portable devices such as cellular telephones.

BACKGROUND OF THE INVENTION

Advances in integrated circuit and battery technology have enabled the ongoing reduction in the size of many electronic devices, such as cellular telephones. Among the advantages of this size reduction are reduced manufacturing costs, reduced power consumption and enhanced convenience for the user. For example, the original cellular phones were not unlike traditional military CB radios and, as such were large and heavy. By contrast, cellular phones now on the market are so small as to be able to be carried comfortably in one's pocket or purse.

Portable rechargeable electronic devices such as cellular telephones must be connected to a power supply to recharge their batteries. It is possible for these devices to employ some form of warning signal such as a beeping tone, warning light or vibration that indicates when the battery requires re-charging. These systems can be deployed as integral parts of the portable device or as part of the battery pack of the portable device. The aforementioned warning systems are effective, however, only when the warning signal is perceived by the user so that the device can be re-connected to its re-charging supply. Thus when the user is not in close proximity to the device when the warning signal sounds—for example, when the phone is left turned on in a purse or coat pocket that is hung in a closet at the end of a day—the device may discharge its battery completely, thereby leaving it useless when needed.

The disclosure in U.S. Pat. No. 6,014,011, hereby incorporated by reference, is directed to a battery charging warning system that overcomes this problem. In particular, it was recognized that it is advantageous to provide a warning capability not only at the portable device but also at the battery charging system. In a particular embodiment disclosed in that patent, the battery charger system generates an alarm signal if the battery is not present in the charger at a particular preset time of day, such as the user's accustomed bedtime. The user is thus prompted to retrieve the portable device from her purse, or wherever it is, and to place it in the charger so that it will be fully charged for use the following morning.

SUMMARY OF THE INVENTION

The embodiments disclosed in the '011 patent involve either a) incorporating all the circuitry needed for implementation of a warning system into the battery charger itself, or b) at a minimum, using a "battery present" indicator lead to connect the battery charger to an alarm clock or the like. A user whose battery charging system does not have the necessary circuitry, or at least the "battery present" indicator lead, would thus have to purchase a new charger base in order to be availed of the described warning functionality. Moreover, the manufacturer(s) of battery chargers compatible with the user's particular portable device and/or battery pack, may have not seen fit to incorporate such circuitry into the charger design.

The present invention is directed to a battery charger warning system that overcomes this problem. In particular, the present invention is directed to a battery charger warning system that provides the same functionality as the embodiments disclosed in the '011 patent, but has the further advantage that it is a stand-alone system to which a standard battery charger of any portable device can be connected. Specifically, the battery charger warning system of the present invention is adapted to be plugged into an electrical outlet and has a receptacle into which the battery charger for a portable device can then be plugged. Once the battery charger for the portable device is connected to the warning system, the system can determine whether or not the battery is presently in the charger. It illustratively does this by detecting electrical current flow to the battery charger, or the lack thereof, that current being battery charging current and/or current being drawn by a battery-present indicator in the charger, such as a light emitting diode (LED) that lights up when the battery is placed in the charger. A warning will be sounded only if the battery is in the charger when the user-established preset time criterion has been met.

If desired, the user can be freed from having to manually set the current time of day in particular embodiments by having the warning system include circuitry that automatically sets and updates the time of day by maintaining wireless synchronization with a radio service such as one of the Coordinated Universal Time clocks, such as the National Atomic Time (NAT) clock located in Boulder, Colo. The United States National Institute of Standards and Technology transmits the time measured by this clock via radio broadcast from Fort Collins, Colo. specifically for synchronization with consumer devices such as the warning system of the present invention.

DETAILED DESCRIPTION OF THE INVENTION

Figure 1:
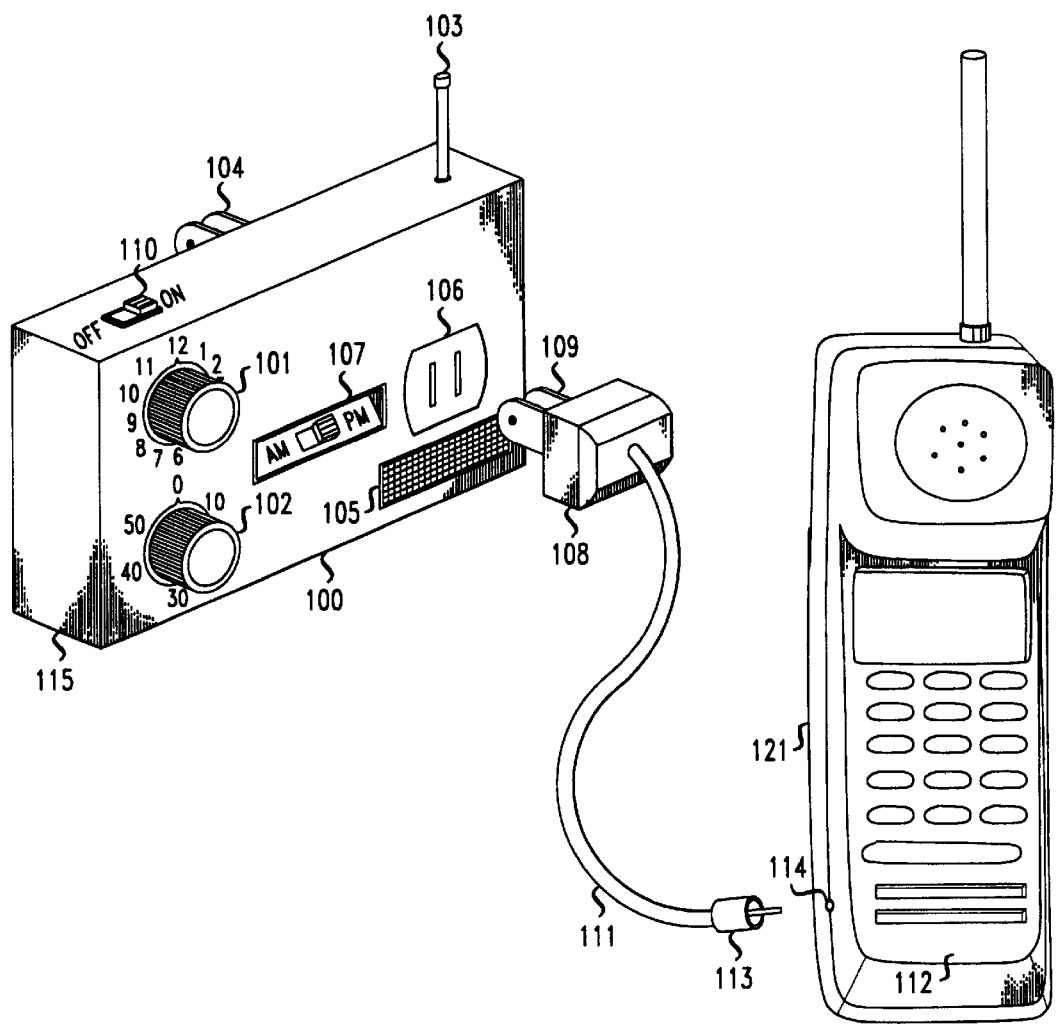
FIG. 1 depicts a battery charger warning system embodying the principles of the present invention.

Battery charger warning system 100 in FIG. 1 includes a housing 115, a radio frequency (RF) receive antenna 103, a knob 101 to set a time of day indication in hourly increments, a knob 102 to set a time of day indication in 10-minute increments, a switch to indicate whether the time of day indication is AM or PM, switch 110 to turn on/turn off the alarm function, a speaker 105, a male electrical plug 104 for connecting to a typical home electrical outlet, and a female electrical receptacle into which battery chargers can be plugged. Although shown schematically as being external to device 100, antenna 103 is preferably contained within the device housing. Battery chargers connected to the warning system may be similar to charger 108, where the charging electronics are located near or are attached to the male electrical plug 109 of the charger device. An electrical cord connected to charger 108 terminates in a male plug 113 which is adapted to connect to a small female receptacle 114 located on the portable device itself, to which battery 121 is attached. Alternatively, the charger may be designed such that the charging electronics are in a cradle-type base into which the portable device or the battery of the portable device is inserted.

Figure 2:
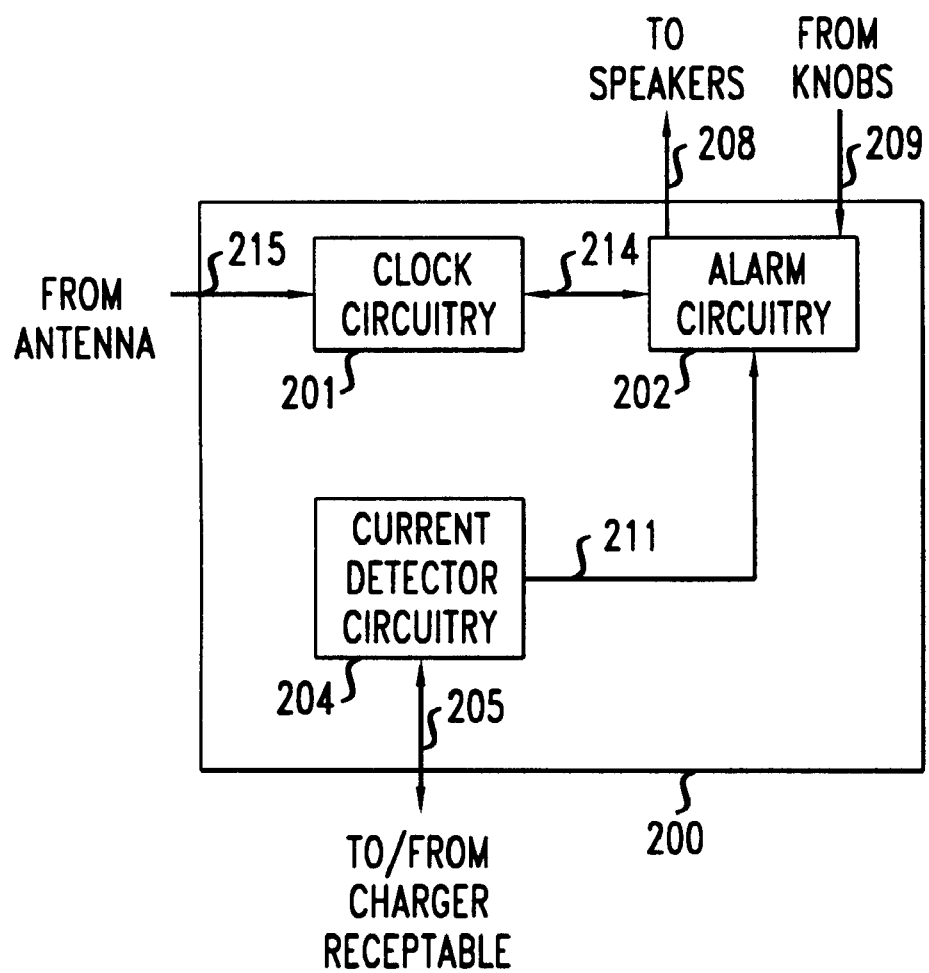
FIG. 2 is a block diagram of illustrative circuitry within the warning system of FIG. 1.

FIG. 2 is a block diagram of illustrative circuitry 200 within the warning system of FIG. 1. The circuitry includes clock circuitry 201 which provides all the logic and control of the clock functionalities. Circuitry 201 illustratively comprises one or more integrated circuit chip(s) that provide(s) timing and logic function functions and other functionalities necessary for time-keeping operations as described herein. In order to automatically set the current time on the warning system, a precise time reference is received from a radio broadcast of a service such as the National Atomic Time (NAT) clock in Boulder, Colo. by antenna 103 in FIG. 1. Once the warning system is plugged into an electrical outlet, this precise time is then provided to clock circuitry 201 via leads 215 to automatically set the clock with no further action by the user. Clock circuitry 201 also provides current time information to alarm circuitry 202 via leads 214. The alarm circuitry 202 manages the setting, silencing and general management of the alarm that a user may wish to set. The user-supplied alarm setting is input via knobs 101 and 102 in FIG. 1, as well as via switches 107 and 110 in FIG. 1, to the alarm circuitry via leads 209. When an alarm is generated, a signal is sent to speaker 105 in FIG. 1 via leads 208 for audio output.

Figure 3:
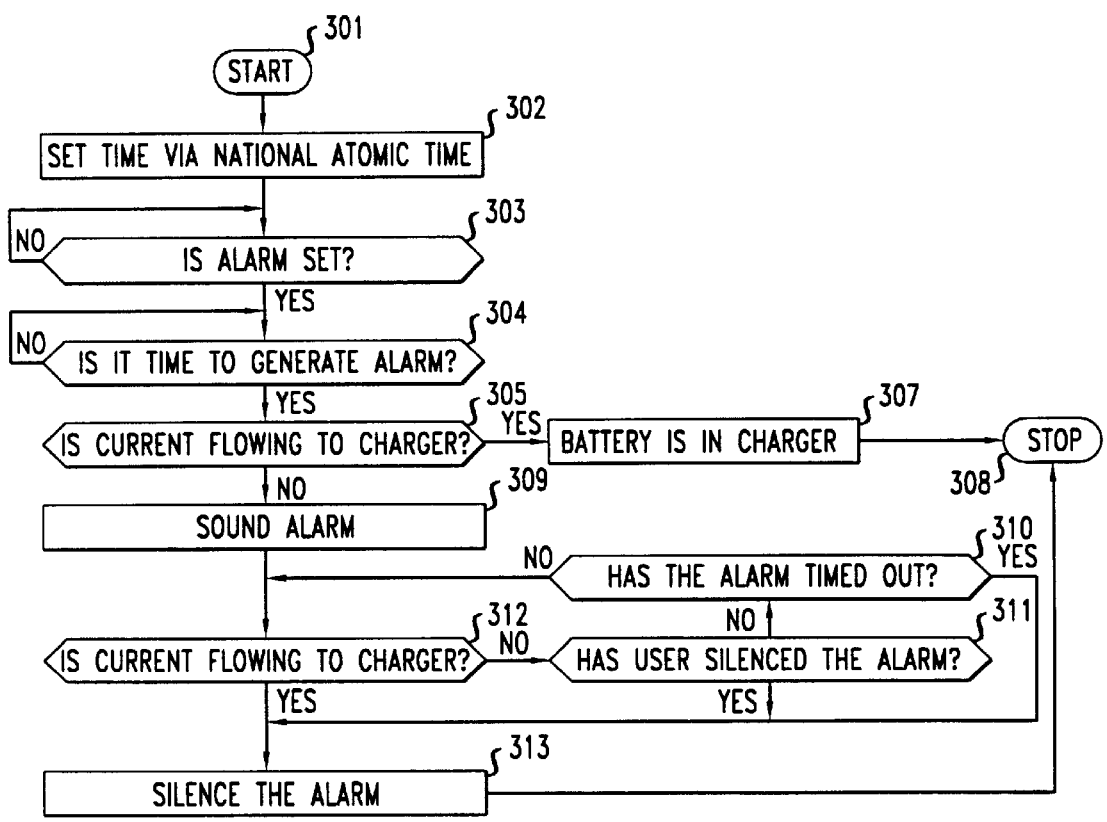
FIG. 3 is a flow chart of operations performed by the circuitry of FIG. 2 in implementing the principles of the invention.

The warning system also includes an electrical current detector 204 that detects current flow to the battery charger connected to the warning system via leads 205. Battery charger electrical current flow status is provided to alarm circuitry 202 via leads 211 so that an alarm can be generated if a) there is no current flow (which indicates no battery currently in the charger) and also b) a pre-set time criterion set by the user is met. Warning system 100 generates an alarm (e.g., a periodic or intermittent tone or "beep") signal if no electrical current is detected flowing to the battery charger and there is a real or potential need for the battery to be re-charged. In this embodiment, more particularly, the warning system determines the potential need for battery recharging on a time-of-day basis, as implemented by the steps of the routine depicted in the flowchart of FIG. 3.

Thus, as indicated at step 302, when the warning system is first plugged into an electrical outlet, the clock circuitry first sets the correct time of day to equal the time value received from the broadcast. At step 303, alarm circuitry 202 checks for any pre-set alarms to determine if the warning system alarm feature of the invention is enabled (i.e., switch 110 is in the on position). If it is not, the routine loops back and continues to either constantly or periodically recheck whether any alarms have been enabled. Using knobs 101 and 102, and switch 107 in FIG. 1, the user has previously selected a time at which s/he wishes the warning system to generate a warning alarm if the battery is not then connected to the charger. Illustratively, a lack of current flow is used as an indication that no battery is connected to the charger. At the present point in time, the routine determines at step 304 whether the user-selected alarm time has arrived, that is, whether it is time to generate an alarm. If not, the routine continuously loops back and continues to either constantly or periodically recheck whether it is time to generate an alarm. When such time to generate an alarm has arrived, a check is then made at step 305 as to whether electrical current is flowing to the battery charger connected to the warning system, as measured by electrical current detector circuitry 204. If yes, the warning system determines at step 307 that the battery is already being charged and no warning is necessary. The routine for that alarm then stops at step 308. If no current is detected at step 305, the warning system will assume that no battery is connected to the charger and will sound an alarm at the set warning alarm time. Once an alarm is generated at step 309, the routine checks at step 312 whether the user thereafter took action to connect the battery to the charger. Illustratively, current flowing to the battery charger, would indicate that a battery has been connected. If YES, then a battery has been connected to its charger and the alarm is silenced at step 313. If no current flow is detected at step 312, then the routine checks at step 311 whether the user has manually suppressed the alarm by sliding switch 110 in FIG. 1 to "OFF." If the alarm has not been manually suppressed by the user, the routine checks whether the alarm has timed out at step 310. If not then the routine checks whether current is flowing to the charger and continues to sound an alarm until either the alarm has been manually silenced at step 311 or the alarm has timed out at 310. If at any point current is detected or the alarm is manually suppressed, the alarm is silenced at step 313 and the routine for that alarm is halted at step 308.

In the claims hereof, any element expressed as a means for performing a specified function is intended to encompass any way of performing that function, including, for example, a) a combination of circuit elements which performs that function or b) software in any form (including, therefore, firmware, microcode or the like) combined with appropriate circuitry for executing that software to perform the function. The invention defined by such claims resides in the fact that the functionalities provided by the various means are combined and brought together in the manner which the claims call for. Applicant thus regards any means which can provide those functionalities as equivalent to those shown herein.

The foregoing merely illustrates the principles of the invention and many variations are possible. For example, the system could provide for manually setting the current time, as opposed to automatically setting the time as described hereinabove. Additionally, while the above embodiments refer to only one charger connected to the warning system with one preset alarm, the warning system may be capable of monitoring multiple chargers with multiple alarm settings each. Many methods of providing input to the warning system are possible. For example, instead of using simple manual knobs with time settings in hourly and 10 minute interval settings as disclosed hereinabove, additional circuitry may be added to allow for a visual display and buttons to enter alarm settings. This would allow for precise setting of multiple alarms and other potential functions. Additionally, the warning system disclosed herein may provide alarms in the form of a repeating synthesized voice, or as a visual, audio, tactile or other signal which can be continuous, rather than intermittent. Further, circuitry may be incorporated into the disclosed warning system that will automatically send an e-mail, voice message, or electronic page to a preset destination to remind the user of the potential need to recharge the battery in question.

In the illustrative embodiment, the male plug that connects the housing to an electrical power source extends directly out of the housing, advantageously allowing the housing to be installed flush with a wall and, as such, be out of the way. If desired however, the male plug could be at the end of an electrical cord which extends into the housing, allowing the battery charger warning system to be placed, for example, on a table top. The female receptacle could likewise be at the end of a cord extending into the housing rather than being installed substantially flush with the housing as shown in the illustrative embodiment.

The embodiments of the present invention described hereinabove apply to a warning system used with a battery charger to which current is constantly flowing when a battery is connected to the charger. However, other battery chargers do not constantly maintain current flow. These chargers will generate sufficient current to charge the battery and will then halt current flow, typically upon detecting a change in battery temperature or the detection of peak battery voltage. With these chargers, the warning system may generate a false alarm Is because the battery may still be in the charger, but no measurable current may be flowing to that battery. If, in such a case, the user-selected time criterion is met, then the alarm will sound, indicating that the user should insert a battery into the charger when, in fact, this has already been done.

This problem can be addressed several ways. For example, if the portable charging device includes a battery-present indicator, such as an LED, the warning system will detect the resulting current flow to the charger. If no such indicator exists on the portable battery charging device, an adapter can be provided for use between plug 113 and receptacle 114 that, upon being inserted into the portable device, draws current that is detectable by the warning system. In a particular embodiment, plug 113 plugs into this adapter and the adapter then plugs into receptacle 114. The adapter contains a micro-switch which, upon insertion of the adapter into receptacle 114, is depressed thereby closing a circuit and allowing an impedance element (such as an LED) to draw current which the battery charging warning system detects. Thus, even if a battery is fully charged and is not drawing any current, the warning system can detect that the portable device is still connected to the battery charger. Thus, the warning system is able to determine that no alarm should be generated.

The functions performed by the circuitry implementing the invention can be of any desired type including, but not limited to special-purpose logic and control circuits, appropriately programmed application-specific integrated circuits and/or digital signal processor hardware or general purpose processor operating under program control.

It will thus be appreciated that those skilled in the art will be able to devise yet various further alternative arrangements which, although not explicitly shown or described herein embody the principles of the invention and thus are within their spirit and scope.

What is claimed is:

1. Apparatus comprising:
    a housing;
    a male plug for connecting said housing to an electrical power source; and
    a receptacle within said housing for receiving a plug to connect a battery charging system; and
    alarm circuitry contained within said housing, said circuitry comprising:
        means for determining whether a portable device battery is connected to said battery charger; and
        means for generating an alarm in response to a determination that a) said battery is not connected to said battery charger; and b) at least one predetermined time criterion is met.

2. Apparatus comprising:
    a female receptacle adapted to receive an electrical male plug for electrically connecting a portable device battery charger to said apparatus;
    means for detecting the electrical current drawn by said battery charger; and
    means for generating an alarm in response to a determination that a) electrical current is not being drawn by said battery charger; and b) at least one predetermined time criterion is met.

3. The invention of claim 1 wherein said means for determining is an electrical current detector.

4. The invention of either claim 1 or claim 2 wherein said predetermined time criterion is that the present time-of-day is a particular user-selected time of day.

5. The invention of either claim 1 or claim 2 further comprising means for automatically setting the present time of day in the apparatus of the present invention.

6. The invention of claim 5 wherein said means for automatically setting comprises:
    means for receiving a time of day indication signal from an external time source; and
    means for updating the present time of day stored in said apparatus.

7. The invention of claim 6 wherein said means for receiving comprises receiving a radio signal from one of the Coordinated Universal Time Clocks and means for updating comprises setting the time of day in accordance with said signal.

* * * * *